United States Patent Office 2,764,613
Patented Sept. 25, 1956

2,764,613

N-ALKYL BENZILIC AMIDES

Frederick A. Grunwald, Evansville, Ind., assignor to Mead Johnson & Company, Evansville, Ind., a corporation of Indiana No Drawing. Application June 7, 1955,
Serial No. 513,891

3 Claims. (Cl. 260—559)

This invention relates to N-alkyl benzilic amides and, more specifically, to those compounds selected from the group consisting of N-ethyl benzilic amides and N-isopropyl benzilic amides.

The compounds of this invention have the formula:

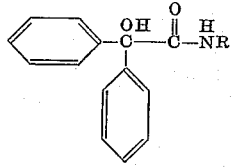

wherein R is selected from the group consisting of ethyl and isopropyl.

It has been discovered that the N-ethyl and N-isopropyl derivatives above specified are useful therapeutic agents and are particularly useful as intiepileptics or anticonvulsants. These particular compounds each have the property of preventing the convulsions induced by Metrazol (used for testing agents which may be effective against petit mal convulsions or seizures) and also prevent convulsions produced by the electroshock technique (used for testing agents which may be of value in grand mal seizures). Thus it has been found that these compounds are unique and distinguishable from certain related compounds which are less effective anticonvulsants or which may be effective against Metrazol or electroshock, but not against both.

The compounds of this invention are administered orally in the form of tablets, capsules or elixirs with the normal dosage for an adult being between ½ and 1½ grams daily in divided doses, and for children in dosages between ¼ and ½ gram daily in divided doses.

It is accordingly an object of this invention to provide new chemical compounds which are particularly effective against two types of convulsive seizures.

The compounds of this invention may be prepared by a number of different methods. Two procedures have been adapted for the preparation of N-ethyl benzilic amide. Methyl benzilate may be treated with anhydrous ethyl amine in absolute methanol containing a catalytic amount of sodium methoxide to give the desired amide. By an alternate method benzilic acid is first converted to α-chlorodiphenylacetyl chloride which is treated with ethylamine to give N-ethyl-α-chlorodiphenylacetamide; the latter is converted to N-ethyl benzilic amide by boiling with dilute hydrochloric acid. N-isopropyl benzilic amide is most conveniently prepared by the second method above mentioned utilizing isopropylamine.

Example 1

(A) To a solution of 0.04 mol of methyl benzilate (prepared by the method of Acree, Ber. 37, 2764 (1904)) in about 125 milliliters of anhydrous methanol containing about 0.2 gram of sodium methoxide, there is added a large excess of anhydrous ethylamine (20 equivalents, 0.8 mol). The reaction mixture is permitted to stand for about six days in a tightly stoppered container and the crude amide is then isolated by evaporating the solution to dryness. The solid is washed with water and dried; recrystallization from methanol-water gives N-ethyl benzilic amide, melting point 102.5–103.8°.

(B) Anhydrous ethylamine (0.25 mol) is added with agitation to a solution of 0.125 mol of α-chlorodiphenylacetyl chloride (prepared by the method of McKenzie and Boyle, J. Chem. Soc. 119, 1137 (1921)) in 60 milliliters of anhydrous ether cooled in an ice bath. Ethylamine hydrochloride precipitates and is filtered off. The ethereal solution of product is extracted first with 1 N hydrochloric acid, then with 5% sodium carbonate solution, and finally with water. The ether solution is separated and evaporated to dryness to give N-ethyl-α-chlorodiphenylacetamide, which is converted to N-ethyl benzilic amide by boiling with 0.3 N hydrochloric acid. Recrystallization from methanol-water gives white crystals of melting point 102.5–103.8°. Analysis: Calculated for $C_{16}H_{17}NO_2$: N, 5.49. Found: N, 5.34.

Example 2

To a stirred solution of 0.8 mol of isopropylamine in 1.5 liters of anhydrous ether chilled in an ice bath, there is added dropwise a solution of 0.4 mol of α-chlorodiphenylacetyl chloride in one liter of anhydrous ether. The addition requires 1.25 hours and the mixture is stirred one hour longer while permitting it to warm to room temperature. The precipitated isopropylamine hydrochloride is separated by filtration and the ethereal solution of the intermediate α-chloro amide is treated as described in part B of Example 1. After the acid hydrolysis white crystals of N-isopropyl benzilic amide are obtained; recrystallization from methanol-water gives material of analytical purity, melting at 121.5–122.5°. Analysis: Calculated for $C_{17}H_{19}NO_2$: N, 5.20. Found: N, 5.24.

While several specific methods of preparing the compounds of this invention are shown above, it will be understood, of course, that the invention is not to be limited thereto, since many modifications may be made, and it is contemplated, therefore, by the appended claims, to cover any such modifications as fall within the true spirit scope of this invention.

I claim:

1. An N-alkyl benzilic amide having the formula:

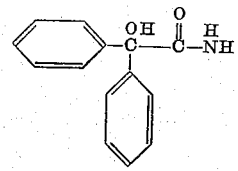

where R is selected from the group consisting of ethyl and isopropyl.

2. N-ethyl benzilic amide.

3. N-isopropyl benzilic amide.

References Cited in the file of this patent

FOREIGN PATENTS 438,659    Great Britain _____ Nov. 15, 1935

OTHER REFERENCES

Curtius: "J. Prakt Chem.," vol. 95, Series 2 (1917), pp. 204 and 205.